(12) United States Patent
Sugiura et al.

(10) Patent No.: US 7,971,128 B2
(45) Date of Patent: Jun. 28, 2011

(54) SOFT DECISION CORRECTION METHOD, RECEIVER USING THE SAME, AND PROGRAM THEREFOR

(75) Inventors: Yasunobu Sugiura, Yokohama (JP); Manabu Sawada, Yokohama (JP)

(73) Assignee: DENSO CORPORATION, Kariya (JP)

( * ) Notice: Subject to any disclaimer, the term of this patent is extended or adjusted under 35 U.S.C. 154(b) by 890 days.

(21) Appl. No.: 11/942,500

(22) Filed: Nov. 19, 2007

(65) Prior Publication Data
US 2008/0120529 A1    May 22, 2008

(30) Foreign Application Priority Data

Nov. 21, 2006 (JP) ................................. 2006-314354

(51) Int. Cl.
*H03M 13/00* (2006.01)
(52) U.S. Cl. ........................................ 714/780; 370/344
(58) Field of Classification Search .................. 714/780; 370/321, 337, 344, 347
See application file for complete search history.

(56) References Cited

U.S. PATENT DOCUMENTS

| | | | | |
|---|---|---|---|---|
| 6,084,865 | A * | 7/2000 | Dent | 370/321 |
| 7,761,777 | B2 * | 7/2010 | Lee et al. | 714/780 |
| 2002/0089923 | A1 * | 7/2002 | Yoshida et al. | 370/208 |
| 2004/0180695 | A1 * | 9/2004 | Sano | 455/561 |

FOREIGN PATENT DOCUMENTS

| | | |
|---|---|---|
| EP | 1 054 541 A2 | 11/2000 |
| JP | A-2001-257604 A | 9/2001 |

OTHER PUBLICATIONS

German Office Action dated Mar. 26, 2010 issued from the German Patent Office in the corresponding German patent application No. 10 2007 055 388.0-31 (with English translation).
Sugiura et al., A study on the reduction of the influence of the interference depended on EVM fluctuation in an OFDM receiver, The 29th Symposium on Information Theory and Its Applications (SITA2006), Hakodate, Hokkaido, Japan, Nov. 28-Dec. 1, 2006.
Notice of Reasons for Rejection mailed on Jun. 8, 2010 issued from the Japanese Patent Office in the corresponding Japanese patent application No. 2006-314354 (with English translation).

* cited by examiner

*Primary Examiner* — Guy J Lamarre
(74) *Attorney, Agent, or Firm* — Posz Law Group, PLC

(57) ABSTRACT

A soft decision value correction method can detect interference occurring in a desired wave and correct a soft decision value where a received power difference between the desired wave and an interference wave is small. A receiver and a program capable of performing the soft decision value correction method are provided. In the receiver an EVM calculator sets a detection distance for a primary modulation symbol of the first subcarrier in the first OFDM symbol as a reference, and calculates an evaluation value $\Delta E_{l,m}$ that is an index of a distance between the primary modulation symbol of the reception signal and the reference. When the evaluation value $\Delta E_{l,m}$ is greater than or equal to a normal threshold, a weighting controller infers that interference occurred, and multiplies a soft decision value $W_{l,m,n}$ by a weighting factor to calculate a corrected soft decision value $V_{l,m,n}$.

12 Claims, 9 Drawing Sheets

FIG. 14

| LEVEL | WEIGHT |
|---|---|
| E1 | $\gamma 1$ |
| E2 | $\gamma 2$ |
| E3 | $\gamma 3$ |
| E4 | $\gamma 4$ |
| E5 | $\gamma 5$ |
| E6 | $\gamma 6$ |
| E7 | $\gamma 7$ |
| E8 | $\gamma 8$ |
| E9 | $\gamma 9$ |
| E10 | $\gamma 10$ |
| E11 | $\gamma 11$ |
| E12 | $\gamma 12$ |
| E13 | $\gamma 13$ |
| E14 | $\gamma 14$ |
| E15 | $\gamma 15$ |
| E16 | $\gamma 16$ |
| E17 | $\gamma 17$ |
| E18 | $\gamma 18$ |
| E19 | $\gamma 19$ |
| E20 | $\gamma 20$ |
| E21 | $\gamma 21$ |
| E22 | $\gamma 22$ |
| E23 | $\gamma 23$ |
| E24 | $\gamma 24$ |
| E25 | $\gamma 25$ |
| E26 | $\gamma 26$ |
| E27 | $\gamma 27$ |
| E28 | $\gamma 28$ |
| E29 | $\gamma 29$ |
| E30 | $\gamma 30$ |
| . | . |
| . | . |
| . | . |
| Ex | $\gamma x$ |
| . | . |
| . | . |
| . | . |

SOFT DECISION CORRECTION METHOD, RECEIVER USING THE SAME, AND PROGRAM THEREFOR

CROSS REFERENCE TO RELATED APPLICATIONS

The present invention is based on and claims priority to unpublished Japanese Patent Application No. 2006-314354 filed on Nov. 21, 2006, the contents of which incorporated herein by reference.

BACKGROUND OF THE INVENTION

1. Field of the Invention

The present invention relates to correcting a soft decision value used for decoding of an error correcting code used in a receiver.

2. Description of the Related Art

A digital wireless communication system that transmits and receives data among a plurality of communication units using wireless communication is previously known. The carrier sense multiple access with collision avoidance (CSMA/CA) method is known as one of the access control systems used in the digital wireless communication systems.

In accordance with a typical CSMA/CA access control method, a communication device that intends to transmit data performs carrier sensing on a channel to be used for communication with a communication device at reception destination. If no carrier is sensed, indicating that the channel is not busy, the communication device transmits the data. If the presence of a carrier is sensed, indicating that the channel is busy, the communication device waits until no carrier is sensed, indicating that the channel is not busy, before transmitting the data.

In a typical wireless communication system, a convolutional code is one of the known coding systems for encoding transmissions. For decoding a signal encoded according to a convolutional code, Viterbi decoding with high error correction capability is widely used.

In Viterbi decoding, the actual convolutional code value of a transmitted signal is estimated in the receiver by selecting most probable state transition from a finite set of possible state transitions corresponding to the convolutional code such that the state transition of an encoder can be correctly assumed in connection with reception of the transmitted signal. The above described procedure is commonly referred to as a maximum likelihood decoding procedure. In accordance with maximum likelihood decoding it is common to use the Hamming distance between the received code and a candidate code as a likelihood for quantitatively expressing the probability that candidate code and the received code match in order to determine the correct state transition. When obtaining the likelihood, a hard decision that represents a binary state as a 0 or a 1 of the reception signal and soft decision that represents the reception signal with multiple values according to the amplitude of the reception signal are known.

It should be understood that the result of the hard decision has a direct effect on the decoding output, without regard to the reliability of the hard decision value, whereas a soft decision value has little effect on the decoding output if the likelihood is small. Accordingly the reliability of soft decision decoding is high compared with hard decision decoding. For reference, a decision value as referred to herein will generally represent the likelihood in soft decision decoding.

A communication device is described in JP 2001-257604 A for performing NULL control of a soft decision value in such a way that, when interference occurs, the soft decision value may not contribute to the Viterbi decoding. Note that, in JP 2001-257604 A, it is assumed that a pulse interference wave transmitted from any other system such as, for example, a meteorological radar, or the like, causes interference in the desired wave that communication device should receive. The communication device described in JP 2001-257604 A, detects the occurrence of interference using criteria that the interference wave is periodic and that the transmission power of the interference wave is much larger than a transmission power of the desired wave, or stated differently, the received power difference between the interference wave and the desired wave is large.

Another problem that arises in wireless systems using CSMA/CA access control, such as in vehicle-to-vehicle communication systems, is interference caused by the so-called "hidden terminal" problem.

For example, in the case where there are a plurality of vehicles, such as vehicle A, vehicle B, and vehicle C, each capable of vehicle-to-vehicle communication using CSMA/CA access control, vehicle B or vehicle C can each communicate with the vehicle A, as shown in FIG. 10. Vehicle B and vehicle C are at locations where mutual communication is impossible, and vehicle B is about to transmit data to the vehicle A. Vehicle B performs a carrier sense of a channel used for communication with vehicle A and finds the channel clear. However, vehicle C could be communicating with A and, since vehicle C is out of range of vehicle B, the communication between C and A will not result in a carrier sense by B. Therefore, even if vehicle C is transmitting to vehicle A, vehicle B determines that a channel used for communication with vehicle A is not busy and will transmit data to the vehicle A. Accordingly, interference in the form of the data from the vehicle B can occur in the vehicle A when receiving the desired wave in the form of the data from the vehicle C.

In such a case, interference occurs between signals transmitted from communication devices having the same configuration and constituting one system. Unlike the previously described high power periodic interferers, in the hidden terminal scenario described above, there is little difference in received power between the desired wave and the interference wave and the interference wave is not necessarily transmitted periodically. Therefore, it is difficult to detect hidden terminal interference occurring in the desired wave such as by using the conventional techniques including the device described in JP 2001-257604 A. As a result, it becomes difficult or impossible to correct the soft decision value for the received signal in which hidden terminal interference is occurring, and thereby decode the received data correctly.

SUMMARY OF THE INVENTION

In light of the above described problems and shortcomings with conventional approaches, the object in accordance with various exemplary embodiments is to provide a method for detecting interference occurring in the desired wave even when the receive power difference between the desired wave and the interference wave is small, and performing correction of the soft decision value. It is a further object to provide a receiver for performing the soft decision value correction, and a program such as a computer program including instructions, or the like.

The soft decision value correction method according to a first aspect of the invention made in order to attain the above-mentioned object corrects the soft decision value generated by demodulating means in a receiver. The demodulating means generates the soft decision value used in decoding the error correcting code by mapping each symbol of N-bits, where N is an integer greater than or equal to 1, of an input bit string that has been coded with an error correcting code. The input bit stream has been rearranged by interleaving at any one of $2^N$ reference mapping locations being set on a complex plane, and by demodulating the reception signal that was modulated so as to become a signal that has an amplitude and a phase correlated to the reference mapping location at which mapping was done.

Then, the soft decision value correction method in accordance with various exemplary embodiments: calculates a variation degree of the reception signal in a process of calculating the variation degree; when the variation degree is more than or equal to a prespecified normal threshold, considers that the interference to the reception signal occurred in the process of the soft decision correction; and corrects the soft decision value for each symbol so that a contribution to decoding of the error correcting code may decrease. It should be noted that the above described corrected soft decision value is used to decode the error correcting code.

Thus, according to the method for correcting soft decision value in accordance with various exemplary embodiments, since the occurrence of interference to the reception signal is detected based on variation degree in the reception signal, the occurrence of interference in the reception signal can be detected even when the received power difference between the reception signal and the interfering signal is small.

The soft decision value correction method in accordance with various exemplary embodiments of the invention, corrects a particular soft decision value calculated for the symbol at which interference is occurring so that the contribution of the particular soft decision value to decoding of the error correcting code may be decreased, and so that the error correcting code can be decoded with a high degree of accuracy, and the quality of communication can be improved.

It should be noted that it should be noted that a soft decision value, for example, as described herein, can be considered a value representing a likelihood or probability that the soft decision closely matches a candidate code. Moreover, in a variation degree calculation process of the exemplary soft decision value correction method, the shortest or smallest distance, such as the Hamming distance, among distances between signal point locations represented on a complex plane according to amplitudes and phases detected on a per symbol basis at the time of demodulating the reception signal and each reference mapping location may be obtained as a detection distance, and the detection distance may be designated as the variation degree.

That is, in an exemplary soft decision value correction method according to an embodiment of the invention, the distance between the signal point location represented on the complex plane and the reference mapping location is calculated as the variation degree.

According to the soft decision value correction method of the invention, when the detection distance is larger than the normal threshold, such as a specified distance, the soft decision value of the symbol corresponding to the detection distance can be corrected so that the contribution to decoding of the error correcting code may decrease.

Further, it is desirable that the variation calculation process of the soft decision value correction method in accordance with various exemplary embodiments is for finding a shortest distance among distances between the signal point locations represented on a complex plane according to amplitudes and phases detected on the symbol basis at the time of demodulating the reception signal and the reference mapping locations as the detection distance, calculating an average detection distance by averaging the detection distances for a prespecified normal number of symbols, and designating the average detection distance as the variation degree.

According to the soft decision value correction method in accordance with various exemplary embodiments, by averaging the detection distances each obtained for each symbol over a normal number of symbols, even when the detection distance obtained for a single symbol becomes accidentally erroneous being affected by noise etc. (for example, even when the distance becomes a very large value or a distance to an erroneous reference mapping location is detected), erroneous determination that interference occurs can be prevented.

Note that, in the variation degree calculation process of the soft decision value correction method in accordance with various exemplary embodiments, the shortest distance among distances between the signal point locations shown on a complex plane according to amplitudes and phases detected on the symbol basis at the time of demodulating the reception signal and the each reference mapping location is obtained as the detection distance. The detection distance that was first obtained after the start of receiving the reception signal is designated a reference distance and a difference between the reference distance and the detection distance may be obtained as the detection difference and that detection difference may be designated as the variation degree.

According to such a soft decision value correction method in accordance with various exemplary embodiments, by designating a difference between the reference distance that was first obtained after the start of reception and the detection distance that is obtained for each symbol as the variation degree, the occurrence of interference can be detected after eliminating the noise component of the reception signal. That is, according to the soft decision value correction method in accordance with various exemplary embodiments, the occurrence of interference can be detected accurately even if the reception signal is one that has large noise.

Moreover, in the variation degree calculation process of the soft decision value correction method in accordance with various exemplary embodiments, the shortest distance among distances between the signal point locations represented on the complex plane according to the amplitudes and phases detected on the symbol basis at the time of demodulating the reception signal and each reference mapping locations, is obtained as the detection distance. Then, the average detection distance found by averaging the detection distances for the prespecified normal number of symbols is obtained, the average detection distance that was first obtained after the start of receiving the reception signal is designated as the reference distance, and a difference between the reference distance and the detection distance can be designated as the variation degree.

In the variation degree calculation process of the soft decision value correction method in accordance with various exemplary embodiments, the following method may be adopted. An amplitude detected on a per symbol basis at the time of demodulating the reception signal is designated as a detection amplitude. A standard deviation of the detection amplitudes is obtained as a detection deviation based on the detection amplitude for the prespecified normal number of symbols. The detection deviation is designated as the variation degree.

Even with such a soft decision value correction method, the occurrence of interference in the reception signal can be detected even when the power difference between the reception signal and other signal that becomes a cause of interference is small. In addition, according to the soft decision value correction method in accordance with various exemplary embodiments, when interference is detected, by correcting the soft decision value so that the contribution of the interference to decoding of the error correcting code becomes small, the quality of communication can be further improved.

Moreover, the variation degree calculation process of the soft decision value correction method in accordance with various exemplary embodiments may perform the following procedures. An amplitude detected on the symbol basis at the time of demodulating the reception signal is designated as the detection amplitude. Based on the detection amplitude for the prespecified normal number of symbols, the standard deviation of the detection amplitude is found as the detection deviation. The detection deviation that was first obtained after the start of receiving the reception signal is designated as the reference deviation. A difference between the reference deviation and the detection deviation is designated as the variation degree.

That is, in the exemplary soft decision value correction method, by designating a detection difference between the reference deviation that was first obtained after the start of reception and the standard deviation obtained for each symbol as the variation degree, the occurrence of interference will be detected from the reception signal with noise eliminated.

By the above described detection, for example, according to the soft decision value correction method in accordance with various exemplary embodiments, the occurrence of interference can be detected even if the reception signal is one that has large noise. By correcting the soft decision value so that the contribution to decoding of the error correcting code associated with the interference may be decreased, the quality of communication can be improved further.

Moreover, in the case where the variation degree is more than or equal to the normal threshold, it is desirable to multiply the soft decision value by a prespecified weighting factor in the soft decision value correction process. The weighting factor may be determined, for example, in accordance with a table in which the variation degree and the weighting factor are correlated in advance in the soft decision value correction process so that the contribution to decoding of the error correcting code may decrease with increasing variation degree.

Where the reception signal received by the receiver is a signal that was transmitted using an orthogonal frequency division multiplexing (OFDM) transmission method, it is desirable to calculate the variation degree based on a complex signal on a frequency axis that is outputted at the time of demodulating the reception signal in the variation degree calculation process of the soft decision value correction method in accordance with various exemplary embodiments. That is, the variation degree calculated by the soft decision value correction method in accordance with various exemplary embodiments may be one that is calculated based on the complex signal outputted in the process of OFDM demodulation.

Note that, when the receiver receives an input bit string as a single packet consisting of a plurality symbols, it is desirable that interleaving of the soft decision value correction method in accordance with various exemplary embodiments allocates each bit before interleaving to a plurality of symbols each being received at a different time in the packet, according to a predetermined rule in such a way that continuous arrangement of the bits that constitute the input bit string before the interleaving may become discontinuous.

According to the soft decision value correction method in accordance with various exemplary embodiments for performing such interleaving, bits that constitute a bit string inputted on the transmission side can be distributed in a packet that is the reception signal, making it possible to decode the whole bit string in the reception signal, for example, even when interference occurs in the latter half of the packet.

Next, the receiver of the second aspect of the invention is equipped with such demodulating means that, regarding an input bit string that was coded with the error correcting code and was rearranged by the interleaving, each symbol of N-bits (N is an integer of unit y or larger) is mapped on any of $2^N$ reference mapping locations being set on a complex plane and the reception signal so demodulated as to become a signal having an amplitude and an phase that are correlated to the reference mapping location at which mapping was done is demodulated, whereby the soft decision value used for decoding the error correcting code is generated.

Then, in the receiver of the second invention, variation degree calculating means calculates the variation degree of the reception signal, and when the degree of the variation is more than or equal to the prespecified normal threshold, the soft decision value correcting means determines that interference in the received signal occurred and corrects the soft decision value for each symbol so that the contribution to decoding of the error correcting code may decrease. However, the above described corrected soft decision value is used for decoding of the error correcting code.

That is, the receiver in accordance with various exemplary embodiments is for realizing the soft decision value correction method of the first aspect in accordance with various exemplary embodiments, which makes it possible for the receiver to obtain the same effect as the effect that can be obtained when the soft decision value is performed.

Here, the above-mentioned portions of an exemplary soft decision value correction method may be a program for making a computer execute certain processes.

In the present case, the program may be recorded on a record medium, such as DVD-ROM, CD-ROM, and a hard disk, that a computer can read and be loaded on the computer as necessary, or may be loaded on the computer through a network.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 14 is a diagram illustrating an exemplary table for setting a weighting factor in accordance with various exemplary and modified exemplary embodiments.

DETAILED DESCRIPTION OF EXEMPLARY EMBODIMENTS

Embodiments of the present invention, including a preferred embodiment, will now be described in further detail with reference to the accompanying drawings.

First Embodiment

Figure 1:
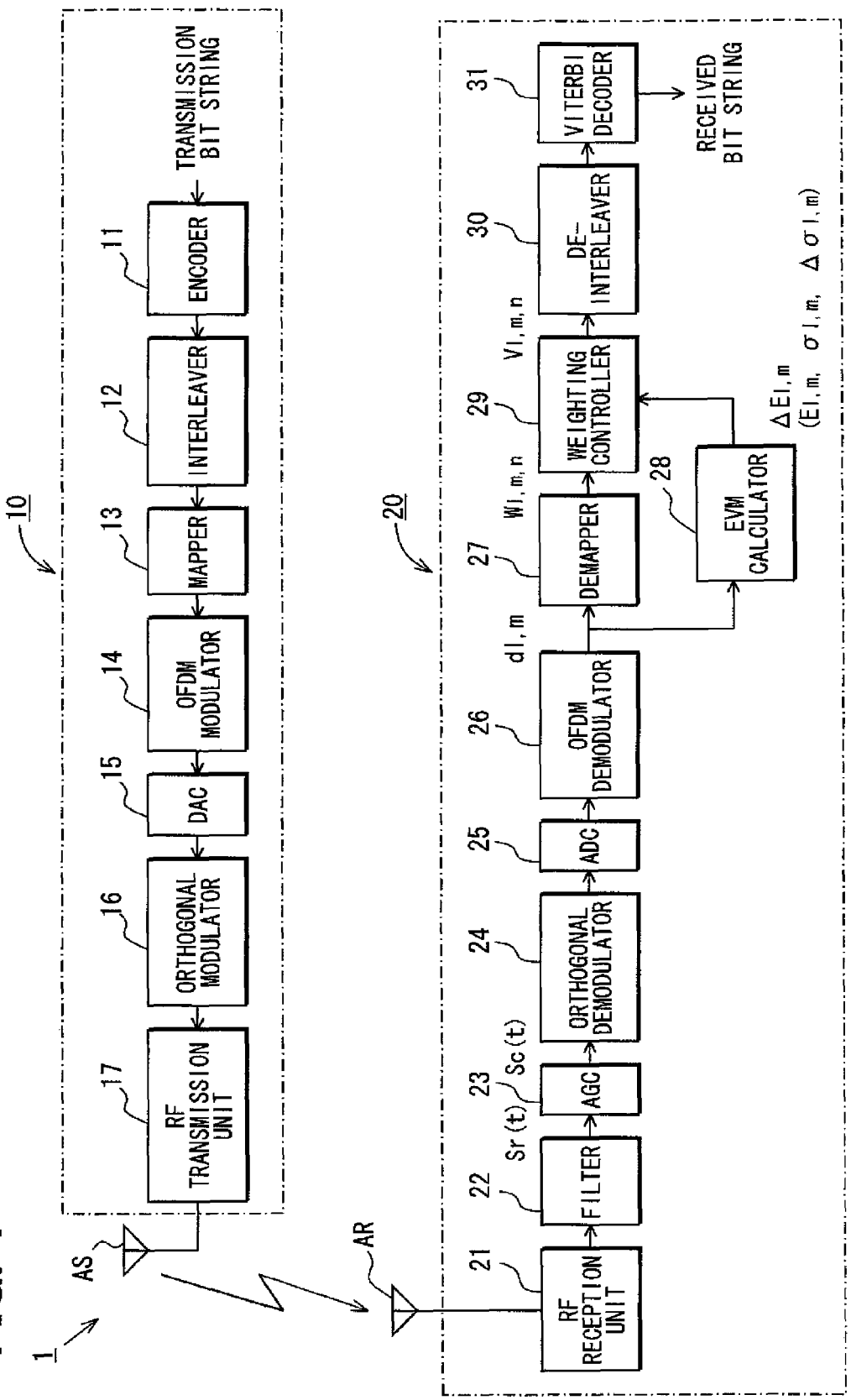
FIG. 1 is a block diagram illustrating an exemplary transmitter and an exemplary receiver constituting a communication system of an embodiment.

In accordance with various exemplary embodiments of the invention a communication system, such as communication system 1, shown in FIG. 1 can consist of a transmitter 10 and a receiver 20 and can consist more substantially of a plurality of transmitters 10 and a plurality of receivers 20. It will also be appreciated that individual units within the communication system 1 can be provided with both a transmitter and a receiver embodied together, for example, as a transceiver, or the like, as would be understood by one of ordinary skill.

As shown in FIG. 1, the configuration of the transmitter 10 includes an encoder 11 for coding a transmission bit string, to be transmitted as a packet unit, with an error correcting code, which, in the present embodiment, is a convolutional code; an interleaver 12 for performing interleaving processing to arranging an order of a code string output from the encoder 11; a mapper 13 for mapping the output of the interleaver 12 onto $2^N$ symbol points, also referred to as reference symbol points, of a quadrature amplitude modulation (QAM) scheme, for every N-bits; an OFDM modulator 14 for generating two data rows representing an in-phase (I) component and a quadrature (Q) component of the OFDM symbol, also referred to herein as secondary modulation symbol, by performing, for example, a reverse fast Fourier transform (FFT) on the output "d" of the mapper 13, also referred to herein as a primary modulation symbol "d," while bringing the OFDM symbols into correspondence with M subcarriers used in OFDM transmission; a digital to analog converter (DAC) 15 for generating two analog baseband signals representing the I component and the Q component by converting two data rows generated by the OFDM modulator 14, respectively; an orthogonal modulator 16 for generating a transmission signal by mixing the two baseband signals generated by the DAC 15; and an RF transmission unit 17 for up-converting the transmission signal generated by the orthogonal modulator 16 into a signal of a transmission frequency band that is set in advance; and finally transmitting the signal through a transmitting antenna AS.

Figure 2A:
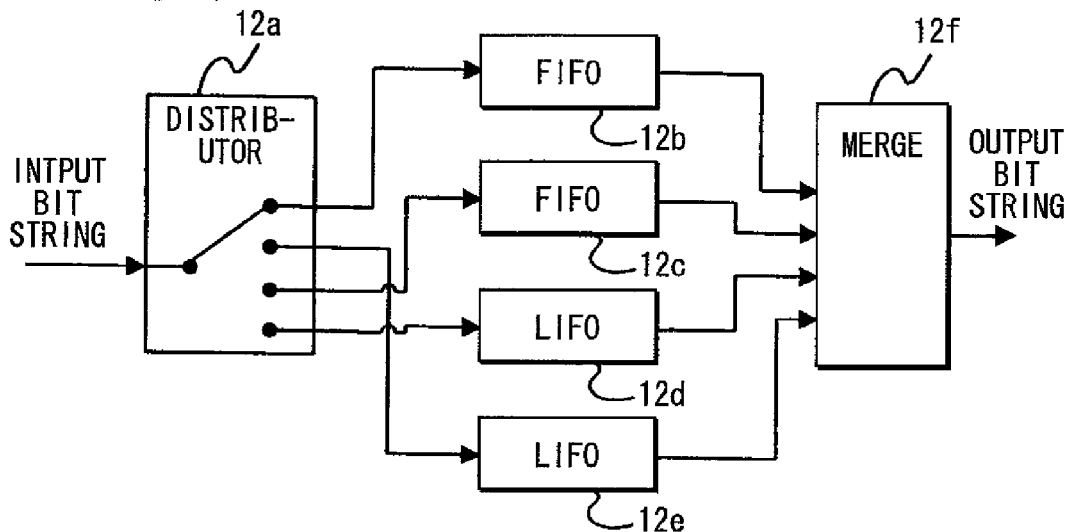
FIG. 2A is a block diagram illustrating processing in an exemplary interleaver.
Figure 2B:
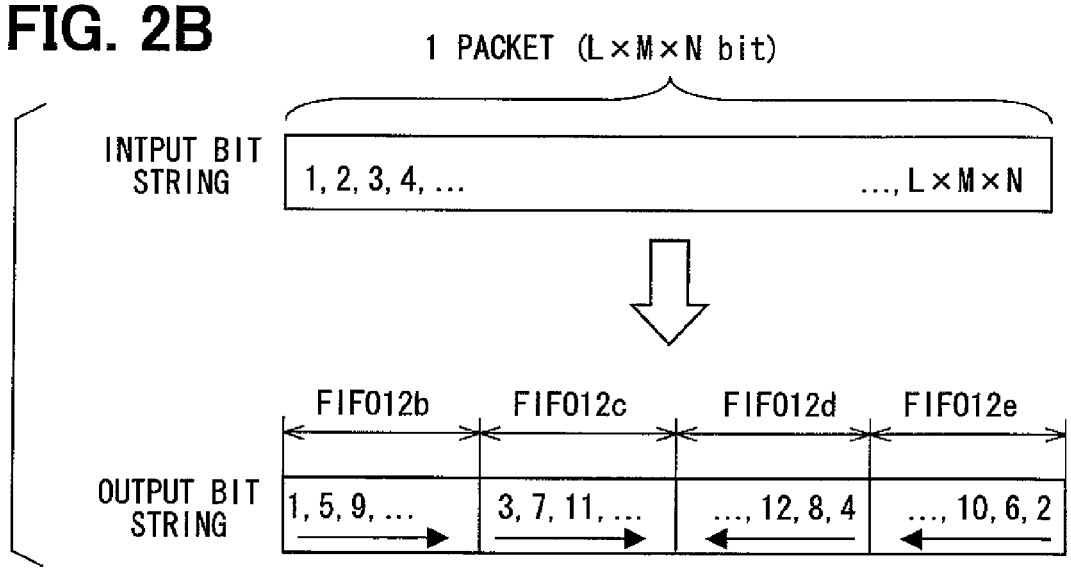
FIG. 2B is a diagram illustrating exemplary results of processing in an interleaver.

FIG. 2A is a block diagram showing the outline of a configuration of the interleaver, and FIG. 2B is an explanatory diagram for explaining interleave processing performed in the present embodiment.

As shown in FIG. 2A, the interleaver 12 includes: a distributor 12a for distributing bits that constitute a bit string according to a prespecified order; first in first out (FIFO) unit 12b and FIFO unit 12c for storing the bits distributed by the distributor 12a and outputting them in a stored order; last in first out (LIFO) unit 12d and LIFO unit 12e for storing the bits distributed by the distributor 12a and outputting them in a reverse order from that of the stored order; and a merge unit 12f for concatenating the bit strings stored in the FIFO 12b, FIFO 12c, LIFO 12d and LIFO 12e in a prespecified order.

Note that, in the present embodiment, each of FIFO 12b, FIFO 12c, LIFO 12d, and LIFO 12e has a storage area of at least M×N bits and the total number of interleaver units such as FIFO 12b, FIFO 12c, LIFO 12d, and LIFO 12e is specified to be an arbitrary number, which, in the present example, is set to 4 for illustrative purposes such as to simplify the description.

As shown in FIG. 2B, the bits that constitute the input bit string inputted into the distributor 12a are allocated, according to an input order, to the FIFO 12b, the LIFO 12e, the FIFO 12c, and the LIFO 12d in the described order. Accordingly, the FIFO 12b stores the first, the fifth, the ninth, . . . and so on, bits among the bits constituting the input bit string, and the FIFO 12c stores the third, the seventh, the eleventh, . . . and so on, bits. The LIFO 12d stores the fourth, the eighth, the twelfth, . . . L×M×N-th bits and LIFO 12e stores the second, the sixth, the tenth, . . . and so on, bits.

Then, when all the bits that constitute the input bit string have been inputted into the FIFO 12b, FIFO 12c, LIFO 12d, and LIFO 12e, the merge 12f concatenates bit strings stored in the FIFO 12b, the FIFO 12c, the LIFO 12d, and the LIFO 12e, respectively, in the described order and outputs the concatenated output bit string to the mapper 13.

That is, the interleaver 12 allocates each bit of the input bit string to the OFDM symbols in the transmission signal so that a continuous arrangement among bits of the bit string inputted from the encoder 11 may become discontinuous when being outputted from the interleaver 12.

With reference again to FIG. 1, the receiver 20 includes an RF reception unit 21 for receiving a transmission signal transmitted from the transmitter 10 through a receiving antenna AR and down-converting it to a signal in a frequency band suitable for signal processing, a filter 22 for eliminating unnecessary frequency components from the output of the RF reception unit 21, an automatic gain control (AGC) amplifier 23 for amplifying a reception signal outputted by the filter 22 by automatically adjusting gain so that the average power may coincide with a target value being set in advance, an orthogonal demodulator 24 for generating baseband signals representing the I component and the Q component from the reception signal amplified by the AGC amplifier 23, and an AD converter 25 for generating two data rows representing the I component and the Q component by sampling the two baseband signals generated by the orthogonal demodulator 24, respectively.

The receiver 20 further includes an OFDM demodulator 26 for demodulating two data rows generated by the AD converter 25 into primary modulation symbols that are brought into correspondence with M subcarriers by performing fast Fourier transform on them, a demapper 27 for generating a soft decision value of N-bits based on the primary modulation symbols demodulated by the OFDM demodulator 26, an EVM calculator 28 for generating an evaluation value for evaluating the variation degree of the reception signal based on the primary modulation symbol demodulated by the OFDM demodulator 26, a weighting controller 29 for generating the code string consisting of a corrected soft decision value by setting the weighting factor based on the evaluation value generated by the EVM calculator 28 and multiplying the demapper-generated soft decision values by the weighting factors, a deinterleaver 30 for rearranging an order of the code string generated by the weighting controller 29 to the original order, and a Viterbi decoder 31 for performing most likelihood decoding based on the output of the deinterleaver 30 and generating a received bit string.

It should be noted that each of the encoder 11, the mapper 13, the OFDM modulator 14, the OFDM demodulator 26, the demapper 27, the EVM calculator 28, the weighting controller 29, and the Viterbi decoder 31 can be realized by a microcomputer performing processing according to a program, such as a series of software instructions prepared in advance and available on a medium readable by the microcomputer such as a storage device or a communication medium such as a network connection, or the like including a wired or wireless network connection.

Next, operation of the receiver 20 will be explained. First, letting T denote a symbol time of the OFDM symbol, letting p(t) denote a pulse waveform defined by Equation 1, and letting $d_{l,m}$ denote each of the primary modulation symbols for the $m^{th}$ subcarriers in the first OFDM symbol, where m=−M/2, −(M/2)+1, - - -, (M/2)−1, the transmission signal Ss(t) transmitted by the transmitter 10 can be expressed by Equation 2.

$$p(t) = \begin{cases} 1 & 0 \le t < T \\ 0 & \text{otherwise} \end{cases} \quad (1)$$

$$S_B(t) = \sum_{l=-\infty}^{\infty} \sum_{m=-\frac{M}{2}}^{\frac{M}{2}-1} d_{l,m} \exp\left(j2\pi \frac{m}{T}(t-lT)\right) p(t-lT) \quad (2)$$

Then, letting h(t) denote an impulse response of a propagation path between the transmitter 10 and the receiver 20, letting f(t) denote an impulse response of the filter 22, which can be assumed to be an ideal rectangular filter, and letting n(t) denote noise whose bandwidth is limited by the filter 22 added in the propagation path, the reception signal Sr(t) whose bandwidth is limited by the filter 22 can be expressed by Equation 3. Note that noise added in the propagation path is assumed for illustrative purposes to be white Gaussian noise whose both-side spectral density is $N_0/2$.

$$S_r(t) = f(t) * h(t) * S_s(t) + n(t) \quad (3)$$

It should be noted that a symbol * in Equation 3 expresses a convolution arithmetic operation.

Designating the gain of the AGC amplifier 23 as g(t), the reception signal Sc(t) amplified by the AGC amplifier 23 can be expressed Equation 4.

$$S_c = g(t) S_r(t) \quad (4)$$

Designating the baseband signal representing an I component that is generated by orthogonal decoding of the amplified reception signal $S_c(t)$ with the orthogonal decoder 24 as Re[$S_c$(t)], designating the baseband signal representing an Q component as Im[$S_c$(t)], and designating a sampling interval by the AD converter 25 as Ts, the k-th data $r^I_q[k]$ that the AD converter 25 sampled the baseband signal Re[$S_c$(t)] can be expressed Equation (5); the k-th data $r^Q_q[k]$ that it sampled the baseband signal Im[$S_c$(t)] can be expressed Equation (6).

$$r^I_q[k] = q(Re[S_c(kT_s)]) \quad (5)$$

$$r^Q_q[k] = q(Im[S_c(kT_s)]) \quad (6)$$

Then, the OFDM demodulator 26 outputs the primary modulation symbol $d_{l,m}$ that corresponds to the m-th subcarrier in the first OFDM symbol based on a data row for which those baseband signals were sampled. Further, the demapper 27 calculates the soft decision value of the n-th bit $W_{l,m,n}$ included in the primary modulation symbol $d_{l,m}$ according to the following Equation 7 or Equation 8.

$$w_{l,m,n} = \begin{cases} \text{Re}[d_{l,m}] & n=1 \\ \text{Im}[d_{l,m}] & n=2 \end{cases} \quad (7)$$

$$w_{l,m,n} = \begin{cases} \text{Re}[d_{l,m}] & n=1 \\ |\text{Re}[d_{l,m}]| - A & n=2 \\ \text{Im}[d_{l,m}] & n=3 \\ |\text{Im}[d_{l,m}]| - A & n=4 \end{cases} \quad (8)$$

It should be noted that in Equation 8, "A" is a value being set for each subcarrier from its amplitude, and is set to $10^{1/2}/5$ in the present embodiment. Equation 7 represents a case where quadrature phase shift keying (QPSK) is used, for example, in the case of N=2, for generation of the primary modulation symbol, while Equation 8 represents a case where quadrature amplitude modulation (QAM), and, in particular, 16QAM is used, for example in a case of N=4, for generation of the primary modulation symbol. Naturally, other cases can be contemplated from these equations by one of ordinary skill in the art.

Figure 3:
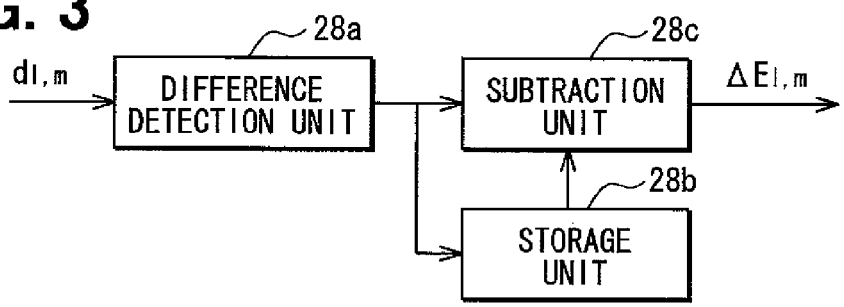
FIG. 3 is a block diagram illustrating a configuration of an error vector magnitude (EVM) calculator in a first embodiment.

Next, the error vector magnitude (EVM) calculator 28 will be explained. With reference to FIG. 3, the basic configuration of the EVM calculator 28 is shown. The EVM calculator 28 can include a storage unit 28b for storing a detection distance $E_{1,1}$, which is referred to hereinafter as a reference distance. The reference distance can be calculated by the difference detection unit 28a from the primary modulation symbol $d_{1,1}$, which is the OFDM symbol for the first received subcarrier. The difference detection unit 28a calculates a distance between a signal point represented by the primary modulation symbol dim and a plurality of reference symbol points, for example, $2^N$QAM symbol points, or the like. The EVM calculator 28 further includes a subtraction unit 28c for subtracting the reference distance $E_{1,1}$ stored in the storage unit 28b from the detection distance $E_{l,m}$ each time the difference detection unit 28a calculates the detection distance $E_{l,m}$ and outputting it to the weighting controller 29 as the evaluation value $\Delta E_{l,m}$.

More specifically, designating the reference symbol point in the difference detection unit 28a as db, the detection distance $E_{l,m}$ can be expressed as in Equation 9.

$$E_{l,m} = B \times \text{Min}|d_{l,m} - d_b| (b=1,2,\ldots 2^N) \quad (9)$$

It should be noted that in Equation 9, B is an arbitrarily determined value to matched with a normal threshold $th_a$, to be described in greater detail hereinafter, which value is set, for example, to 100 in the present embodiment.

Figure 4:
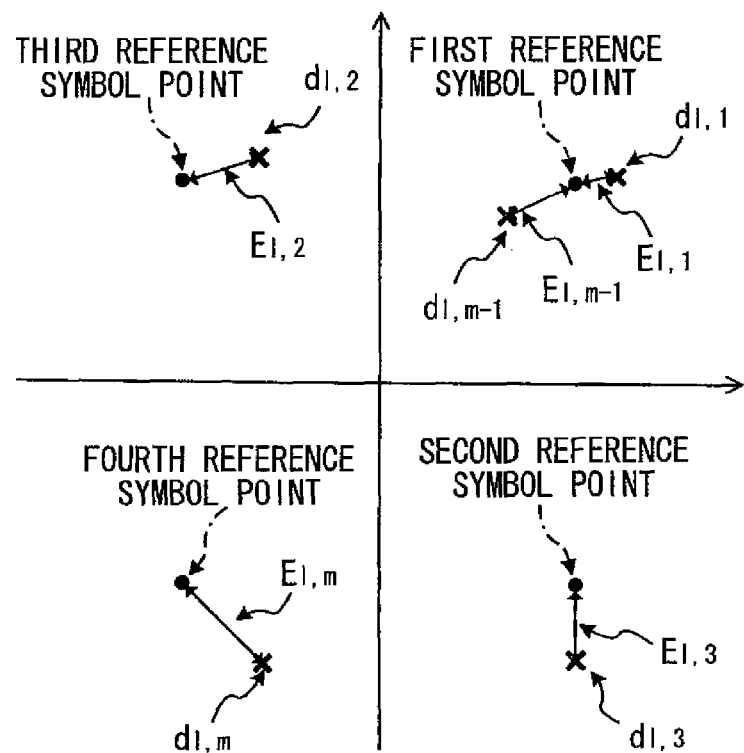
FIG. 4 is a diagram illustrating various examples of an evaluation value outputted from the EVM calculator in accordance with the first embodiment.
Figure 5:
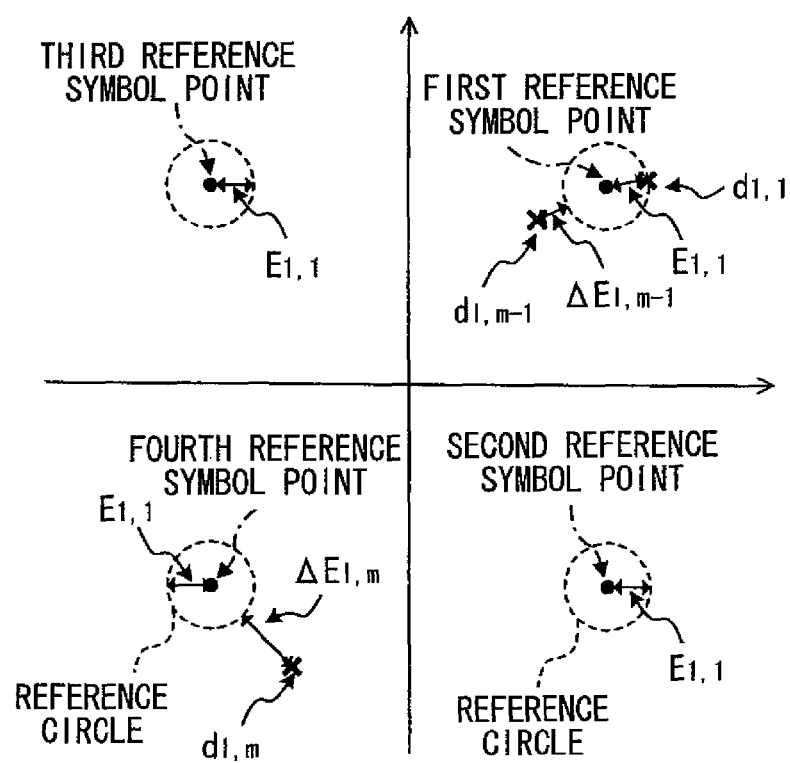
FIG. 5 is a diagram illustrating the distance between various primary modulation symbols and a reference radius of a reference evaluation value outputted, for example, from the EVM calculator of the first embodiment.

With reference to FIG. 4 and FIG. 5, which show various aspects of the present embodiment in connection with the evaluation value $\Delta E_{l,m}$, the EVM calculator 28 designates a shortest distance among distances between the signal point locations represented by the primary modulation symbol, shown in the figure as "d" and each reference symbol point in the constellation of symbols for the particular modulation method, which in FIG. 4 includes the first to the fourth reference symbol points as the detection distance shown in the figure as E. For example, in FIG. 4, if $d_{l,1}$ represents the location of the first primary modulation symbol in the constellation space, a distance $E_{l,1}$ between it and the first reference symbol point will be designated as the detection distance.

As shown in FIG. 5, a difference between the reference distance $E_{1,1}$ that was first outputted in connection with the primary modulation symbol $d_{1,1}$ associated with the first received OFDM symbol for the first subcarrier I and the detection distance outputted in connection with the primary modulation symbol for the second and later subcarriers, namely, $d_{1,2}$ and subsequent primary modulation symbols, shown in the figure, for example, as $d_{l,m-1}$ and $d_{l,m}$ associated with the first received OFDM symbol is designated as the evaluation value. For example, if the primary modulation symbol is $d_{l,m}$, the evaluation value $\Delta E_{l,m}$ can be designated as $E_{l,m}-E_{1,1}$. That is, the evaluation value $\Delta E$ outputted from the EVM calculator 28 can be considered as a distance, such as a Hamming distance, a code distance, a Euclidian distance or the like, from the signal point location represented by the primary modulation symbol to a reference circle $E_{1,1}$, with a radius of the reference distance centered on the reference symbol point at which the signal point location is mapped. Accordingly, in connection with the EVM calculator 28, the variation degree from the reference circle of each signal point location is designated as the evaluation value. It should incidentally be noted that FIG. 4 shows a case where QPSK is employed for primary modulation.

The weighting controller 29 can perform processing shown in Equation 10 on all the soft decision values $W_{l,m,n}$ generated from the first OFDM symbol.

$$v_{l,m,n} = \begin{cases} \gamma_a \cdot w_{l,m,n} & \Delta E_{l,m} \geq th_a \\ w_{l,m,n} & \text{otherwise} \end{cases} \quad (10)$$

That is, when the evaluation value $\Delta E_{l,m}$ calculated by the EVM calculator 28 is greater than or equal to the predetermined normal threshold value $th_a$, it can be inferred that interference has occurred for the OFDM symbol and the soft decision value $W_{l,m,n}$ generated by the demapper 27, multiplied by a weighting factor $\gamma_a$, is designated as the corrected soft decision value $V_{l,m,n}$. When the evaluation value $\Delta E_{l,m}$ calculated by the EVM calculator 28 is less than the normal threshold value $th_a$, the soft decision value $W_{l,m,n}$ generated by the demapper 27, as it is, is designated as the corrected soft decision value $V_{l,m,n}$.

It should be noted that the normal threshold $th_a$ and the weighting factor $\gamma_a$ are constants that can set only after particularized analysis and experimentation. Especially, the weighting factor $\gamma_a$ must be set in such a way that a contribution of the soft decision value $V_{l,m,n}$ to decoding of the error correcting code may be decreased, namely, such that an effect of the soft decision value $V_{l,m,n}$ that is multiplied by the weighting factor $\gamma_a$ on the Viterbi decoding maybe decreased. The case where the weighting factor $\gamma_a=1$, represents a case where correction of the soft decision value by way of the weighting factor is not performed. The corrected soft decision value $V_{l,m,n}$ is then deinterleaved by the deinterleaver 30, and is input into the Viterbi decoder 31, where it is decoded into a receiving bit string.

In the receiver 20 of the first embodiment, the EVM calculator 28 calculates the evaluation value $\Delta E_{l,m}$ as an index representing the distance between the primary modulation symbol $d_{l,m}$ of the received reception signal and the reference circle with respect to the detection distance $E_{1,1}$ for the primary modulation symbol $d_{1,1}$ for the first subcarrier in the first OFDM symbol. Then, if the evaluation value $\Delta E_{l,m}$ calculated by the EVM calculator 28 was greater than or equal to the normal threshold $th_a$, the weighting controller 29 infers that interference occurred in the reception signal, and multiplies the soft decision value $W_{l,m,n}$ calculated for the first OFDM symbol including the primary modulation symbol $d_{l,m}$ by the weighting factor $\gamma_a$ to calculate a corrected soft decision value $V_{l,m,n}$. Subsequently, the Viterbi decoder 31 decodes a receiving bit string from the soft decision value $V_{l,m,n}$ that is inputted through the deinterleaver 30 and is corrected by the weighting controller 29.

As explained above, based on the evaluation value $\Delta E_{l,m}$ calculated from the signal point location that the primary modulation symbol dim expresses for the $m^{th}$ subcarrier in the first OFDM symbol and a reference mapping location, the receiver 20 of the first embodiment can detect that interference occurred in the reception signal even when a difference of the received power between the reception signal and the other signal that becomes a cause of the interference is small.

Therefore, according to the communication system of the present embodiment, by multiplying the soft decision value $W_{l,m,n}$ calculated for the OFDM symbol at which interference is occurring by a weighting factor $\gamma_a$ being set so as to decrease the contribution to decoding of the error correcting code, the Viterbi decoding can be prevented from decreasing in accuracy and the quality of communication can be improved.

Moreover, according to the receiver 20 of the present embodiment, since a difference between the reference distance $E_{1,1}$ calculated for the primary symbol $d_{1,1}$ for the first subcarrier in the OFDM symbol first received after the start of reception and the detection distance $E_{l,m}$ obtained from each primary modulation symbol $d_{l,m}$ is designated as the evaluation value $\Delta E_{l,m}$, the occurrence of interference can be detected in a state where noise is reduced or eliminated from the reception signal. That is, according to the receiver 20, the occurrence of interference can be detected accurately even if the reception signal is one that has large noise.

Figure 6A:
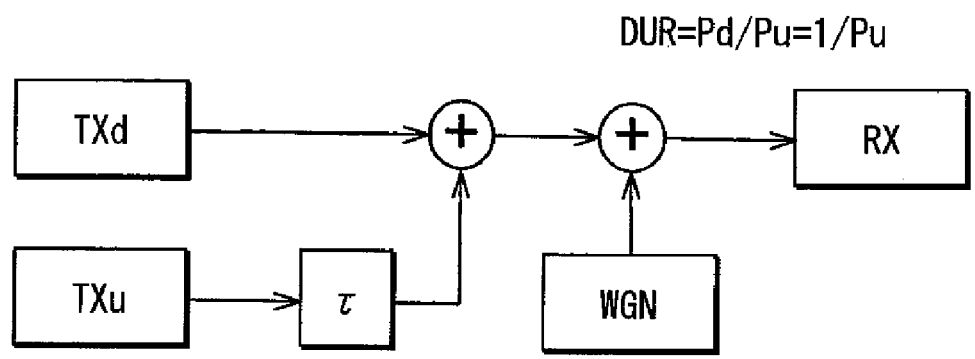
FIG. 6A is a diagram illustrating an interference model simulation.
Figure 6B:
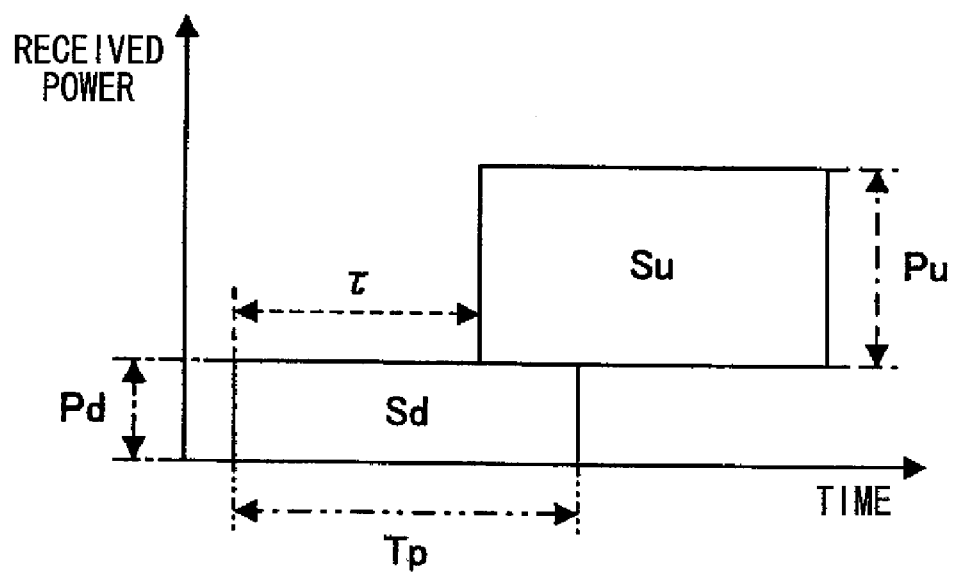
FIG. 6B is a graph illustrating average power for a desired signal and an interference signal associated with the interference model simulation of FIG. 6A.

With reference now to FIG. 6A and FIG. 6B, which show a model of interference in the simulation and a power density graph. In the receiver under simulation, a desired signal Sd having an average reception power Pd=1, and a packet transmission time of Tp, is summed with an interference signal Su starting at a time τ later than the start of receiving the desired signal Sd and having an average reception power Pu and packet transmission time of Tp. The interference signal Su has an overlapping time over the desired signal that can be calculated as Tp-τ. The overlap represents a time of occurrence of interference in the desired signal Sd. It can further be assumed that desired signal Sd and interference signal Su are received as the reception signal along with white Gaussian noise.

Conditions for the above described simulation can be assumed as follows, for example, as shown in Table 1. The interleaving size in the interleaver 12 and the deinterleaver 30 is based on a packet size of 200 OFDM symbols, a modulation/demodulation system used in the mapper 13 and the demapper 27 is QPSK, where N=2, corresponding for example, to $2^2$QAM, the number of subcarriers is M=52, a propagation path characteristic is h(t)=1, and symbol synchronization is in an ideal state.

The overlapping time τ/Tp was set to 0.7, the normal threshold $th_a$ to 30, and the weighting factor $γ_a$ to zero.

TABLE 1

| | |
|---|---|
| Error correcting | Convolutional code (K = 7, R = ½) |
| Packet size | 200 OFDM Symbol |
| Interleave size | 200 OFDM Symbol |
| Subcarrier modulation | QPSK (N = 2) |
| Number of subcarriers | 52 |
| Propagation path | AWGN |
| Decoding | Soft decision Viterbi decoding |

Figure 7:
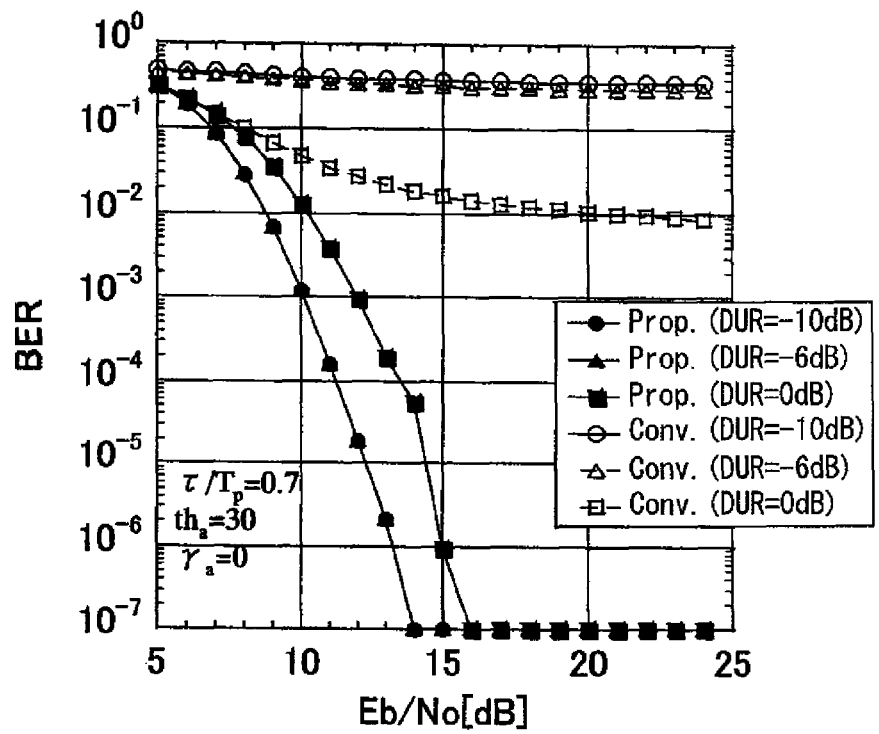
FIG. 7 is a graph illustrating a bit error rate (BER) characteristic as a function of signal to noise ratio (Eb/No) for a simulation result.

It should be noted that the effectiveness of the communication system of the present embodiment can be evaluated based on a result of received bit error rate (BER) characteristic calculated by computer simulation such as is shown, for example, in FIG. 7, which is a graph of a BER characteristic obtained for Eb/No, Eb/No designating noise power density for the average reception energy per information bit of the desired signal Sd. The solid circles plot a result obtained by performing simulation by modeling the receiver 20 shown in the present embodiment, and open circles plot a result obtained by performing simulation with the weighting factor $γ_a$ set to unity representing a conventional receiver where no control of the weighting factor is performed. Furthermore, the present simulation was performed in three different ratios between the average received power of the desired signal and the average received power of the interference signal, such as a desired to undesired ratio (DUR)=Pd/Pu=1/Pu: −10 dB represented by the circle plot in the figure; −6 dB represented by the triangle plot in the figure; and 0 dB represented by the square plot in the figure.

According to the exemplary receiver 20, the graph in FIG. 7 indicates that the received BER is made to decrease regardless of the DUR, that is, the number of errors of the information bits that occur in the desired signal Sd is made to decrease. Furthermore, FIG. 7 shows a result of simulation by modeling the receiver 20, indicating that if Eb/No >15 dB, the BER becomes $10^{-7}$ or less, which shows that, even when interference caused by the interference signal Su occurs in the desired signal Sd, errors that occur in received information bits are reduced.

In addition, the present simulation confirms that, since the overlapping time τ/Tp of the interference signal over the packet transmission time of the desired signal is set to 0.7, the bit strings can be decoded with a high degree of accuracy even when occurrence time of interference that continues for an extended duration compared to that of the above-mentioned conventional invention intended for interference having a relatively short duration.

As explained in the foregoing, by the result of the present simulation, it was verified that even when the received powers of the desired signal and of the interference signal are much the same, the occurrence of interference was able to be detected and the desired signal was able to be decoded with a high degree of accuracy.

Note that according to the receiver 20 of the first embodiment, since the occurrence of interference in the reception signal is detected based on a signal point location represented by the primary modulation symbol $d_{l,m}$ and the reference mapping location, a simple circuit configuration enables the occurrence of interference to be detected and the bit string to be decoded with a high degree of accuracy.

Second Embodiment

Figure 8:
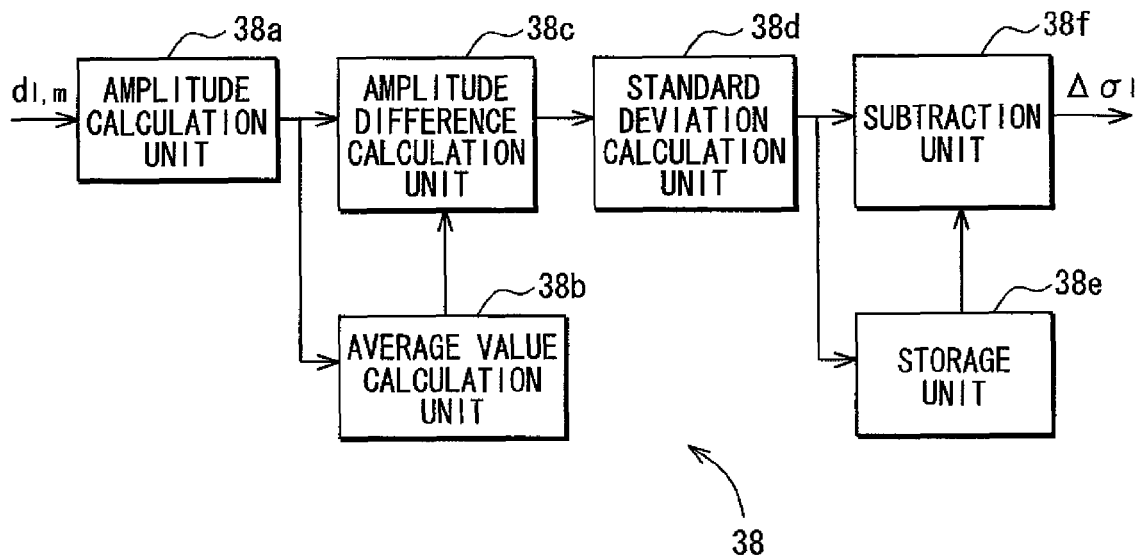
FIG. 8 is a block diagram illustrating a configuration of an EVM calculator in accordance with a second embodiment.

Next, the invention in accordance with a second exemplary embodiment will be explained. The receiver 20 shown in the above-described first embodiment and the receiver of the second embodiment differ primarily in the configuration of the EVM calculator. Accordingly, elements having the same configuration and processing as those of the receiver 20 shown in the first embodiment are designated by the same reference numeral and their explanations are omitted for simplicity. In particular, the exemplary EVM calculator 38, different from that of the first embodiment will be explained. With reference to FIG. 8, a configuration of the exemplary EVM calculator 38 of the second embodiment includes an amplitude calculation unit 38a for detecting the amplitude of the primary modulation symbol $d_{l,m}$ which can be referred to hereinafter as a detection amplitude $g_{l,m}$ for the $m^{th}$ subcarrier associated with the first OFDM symbol. The EVM calculator 38 also includes an average amplitude calculation unit 38b for calculating the average amplitude $g_{AVE1}$ found by averaging all the detection amplitudes $g_{l,m}$ detected by the amplitude calculation unit 38a for the first OFDM symbol. The EVM calculator 38 further includes an amplitude difference calculation unit 38c for calculating an amplitude difference $Δg_{l,m}$ between the average amplitude $g_{AVE1}$ calculated by the average amplitude calculation unit 38b and the detection amplitude $g_{l,m}$ detected by the amplitude calculation unit 38a. The EVM calculator 38 further includes a standard deviation calculation unit 38d for calculating the standard deviation $σ_1$ for the first OFDM symbol based on the amplitude difference $Δg_{l,m}$ calculated by the amplitude difference calculation unit 38c. The EVM calculator 38 further includes a storage unit 38e for storing the standard deviation $σ_1$ calculated for the first OFDM symbol which can be referred to hereinafter as the reference deviation, after the start of reception. The EVM calculator 38 can still further include a subtraction unit 38f for calculating a difference between the reference deviation $σ_1$ stored in the storage unit 38e and the standard deviation $σ_l$ for each OFDM symbol that is calculated by the standard deviation calculation unit 38d and outputting the value to the weighting controller 29 as the evaluation value $Δσ_l$.

It should be noted that the weighting controller 29 in the second embodiment determines that, when the evaluation value $Δσ_l$ is more than or equal to the normal threshold $th_a$, interference occurs for the reception signal and calculates the soft decision value after the correction $V_{l,m,n}$ by multiplying the soft decision value $W_{l,m,n}$ by the weighting factor $γ_a$.

Figure 9A:
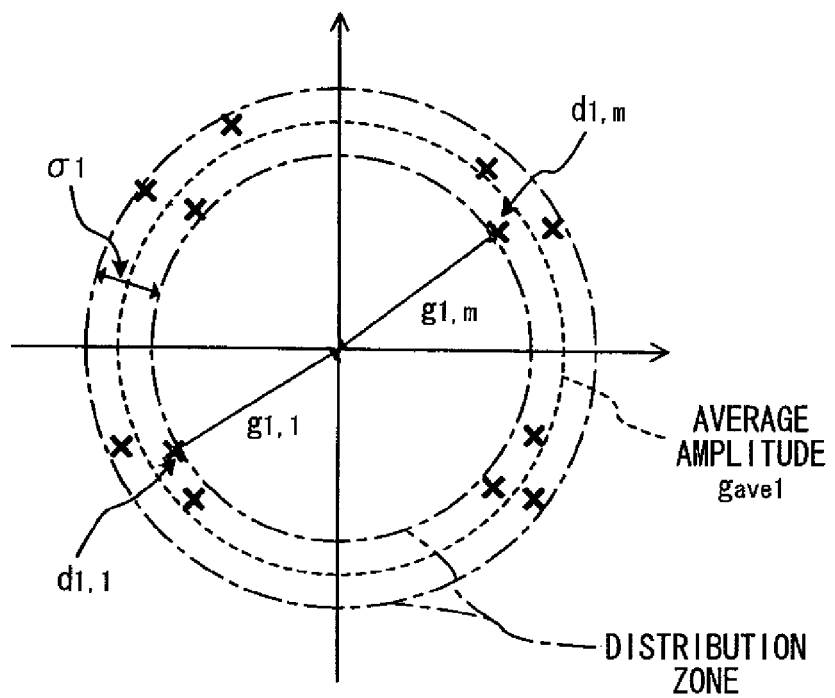
FIGS. 9A and 9B are graphs illustrating various outlines associated with an evaluation value outputted from the EVM calculator and various primary modulation signals in accordance with the second embodiment.
Figure 9B:
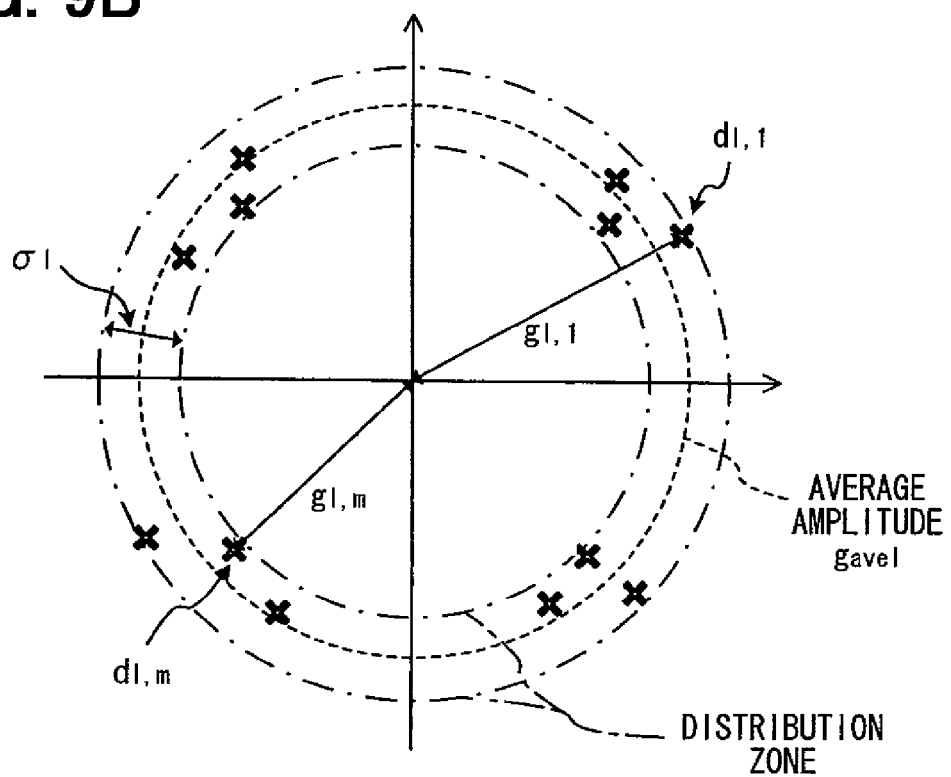
Figure 10:
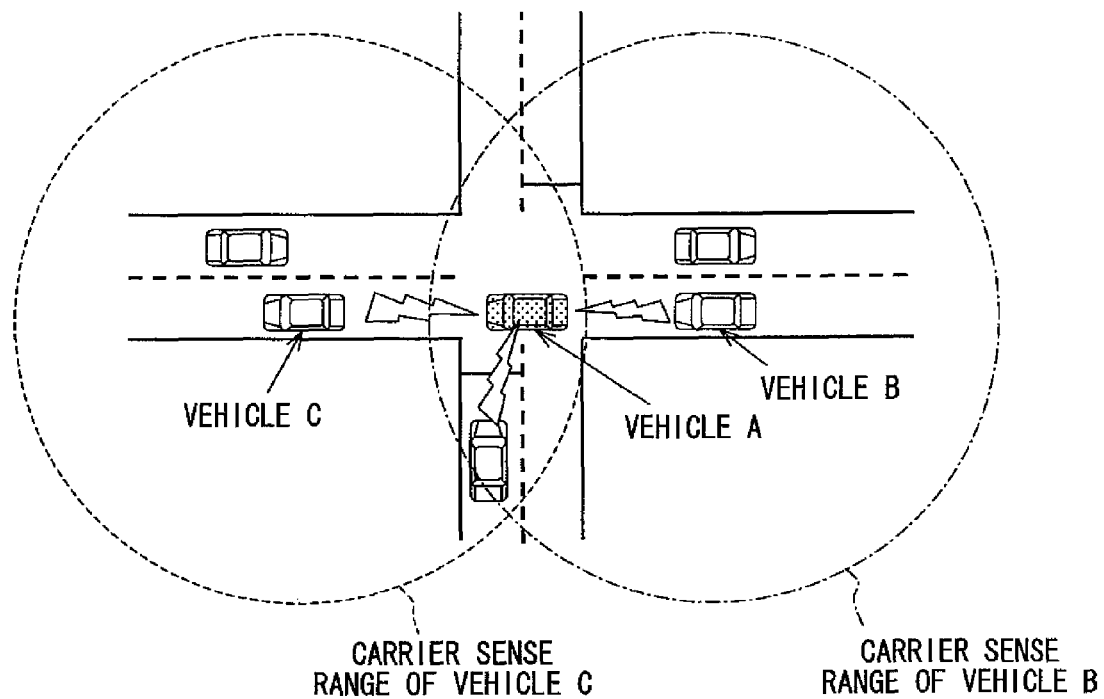
FIG. 10 is a diagram illustrating a hidden terminal problem in a vehicle-to-vehicle communication.

With reference to FIG. 9A and FIG. 9B the evaluation value calculated by the EVM calculator 38 can be explained in greater detail. As shown, the signal point locations of the primary modulation symbol "d" in the OFDM symbol are distributed in a ring whose center is the average amplitude $g_{ave}$, which can be found by averaging amplitudes g of the primary modulation symbols. The ring can be referred to hereinafter as a distribution zone. The width of the present distribution zone indicates variation in the amplitude g at the primary modulation symbol in the OFDM symbol, and the EVM calculator 38 shows the variation degree as a standard deviation σ.

As shown in FIG. 9A, the EVM calculator 38 designates the standard deviation obtained from the OFDM symbol that was first received by the receiver as the reference deviation $σ_l$, and, as shown in FIG. 9B, calculates a difference between the standard deviation $σ_l$ obtained for the second and later OFDM symbols and the reference deviation $σ_1$.

The EVM calculator 38 designates a difference between the width of the distribution zone for the OFDM symbol that was first received by the receiver and the width of the distribution zone for the second and later OFDM symbols as the evaluation value Δσ. Therefore, the receiver of the second embodiment considers that interference occurred when the width of the distribution zone obtained from each OFDM symbol becomes larger than the width of the distribution zone obtained from the OFDM symbol that was first received by the receiver by the normal threshold $th_a$ or more. It should be noted that the use of standard deviation σ in FIG. 9A and FIG. 9B is for illustrative purposed to assist in the understanding of the invention, and does not provide an exhaustive expression of the concept which will be described in greater detail herein below.

As explained above, according to the receiver of the second embodiment, since the occurrence of interference in the reception signal is detected based on the standard deviation $\sigma_1$ calculated from the detected amplitude $g_{l,m}$ of the primary modulation symbol $d_{l,m}$ for the first OFDM symbol, the occurrence of interference in the reception signal can be detected even when the power difference between the reception signal and the other signal that becomes a cause of interference is small.

Moreover, according to the communication system 1 of the second embodiment, by multiplying the soft decision value $W_{l,m,n}$ calculated for the OFDM symbol at which interference is occurring by the weighting factor $\gamma_a$ being set such that the contribution to decoding of the error correcting code may decrease, the Viterbi decoding can be prevented from decreasing in accuracy and the quality of communication can be improved.

Other Embodiments

Although explanations in accordance with various exemplary embodiments are given in the foregoing description, the present invention is not limited or restricted to the above described embodiments and can be carried out in various modes without departing from the gist in accordance with various exemplary embodiments.

Figure 11:
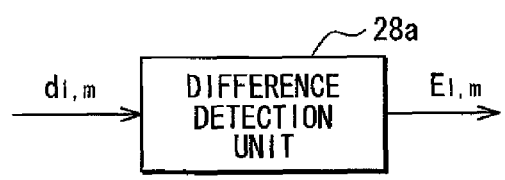
FIG. 11 is a block diagram illustrating a modification of the EVM calculator of the first embodiment.

For example, although the EVM calculator 28 in the first embodiment includes the difference detection unit 28a, the storage unit 28b, and the subtraction unit 28c, the substantial constitution of EVM calculator 28 may include only the difference detection unit 28a, for example, as shown in FIG. 11. In particular, the difference detection unit 28a of the EVM calculator 28 may output the detection distance $E_{l,m}$, that is obtained from the primary modulation symbol $d_{l,m}$ for the $m^{th}$ subcarrier in the first OFDM symbol as the evaluation value E, for example, as shown in FIG. 4. In the present case, the EVM calculator 28 will define the distance between the signal point location at which each primary modulation symbol $d_{l,m}$ is mapped and the standard symbol location as the evaluation value E.

Moreover, the EVM calculator 28 of the first embodiment, in addition to the above described operation, may average the detection distance outputted from the difference detection unit 28a on an OFDM symbol basis to form what is referred to hereinafter as an average detection distance. That is, the average detection distance for the first OFDM symbol may be designated as the reference distance, and a difference between the reference distance and the average detection distance for the second and later OFDM symbols may be outputted to the weighting controller 29 as the evaluation value. Moreover, in the case where the EVM calculator 28 substantially consists of only the difference detection unit 28a, the obtained average detection distance may be used as the evaluation value. It will be appreciated that by averaging the detection distance on an OFDM symbol basis, the occurrence of interference can be detected accurately even when the detection distance at one primary modulation symbol becomes accidentally long by an effect of noise or interference. Although in the preceding explanation, the detection distance is averaged on the OFDM symbol basis, the averaging method is not restricted to such an approach. For example, the detection distance may be averaged for each subcarrier of the same frequency.

It should further be noted in accordance with additional embodiments, that although, for example, the EVM calculator 38 in the second embodiment outputs a difference between the reference deviation $\sigma_1$ calculated for the first OFDM symbol and the standard deviation $\sigma_1$ for the second and later OFDM symbols as the evaluation value Δσ, the calculation method of the evaluation value in the second embodiment is not restricted to such an approach.

Figure 12:
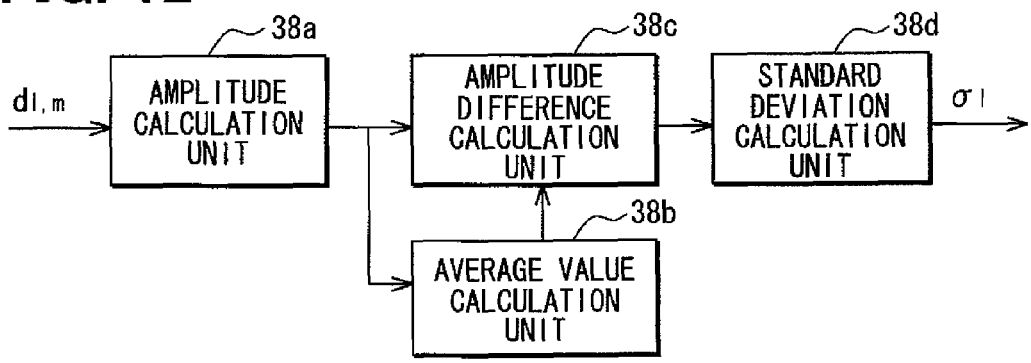
FIG. 12 is a block diagram illustrating a modification of the EVM detector of the second embodiment.

For example, the EVM calculator 38 outputs the variation degree of the detection distance g as shown in FIG. 9A and FIG. 9B as a width in a distribution zone in the figure. In other words, the standard deviation $\sigma_1$ for the detection amplitude $g_{l,m}$ of the primary modulation symbol $d_{l,m}$, may be used as the evaluation value σ. As shown in FIG. 12, the storage unit 38e and the subtraction unit 38f may be eliminated in the EVM calculator 38 of the second embodiment.

Further, although, in the above-mentioned first embodiment and second embodiments a calculation method is described such that, when the evaluation value outputted from the EVM calculator 28 is more than or equal to the normal threshold $th_a$, the soft decision value $W_{l,m,n}$ generated by the demapper 27 is multiplied by the predetermined weighting factor $\gamma_a$, the calculation method of the weighting factor $\gamma_a$ is not restricted to such an approach.

For example, the weighting factor may be automatically determined from the evaluation value calculated by the EVM calculator 28 according to a table in which the magnitude of the evaluation value and the weighting factor are correlated in advance, as shown, for example, in FIG. 14. In accordance with the resulting receiver, since the weighting factor is varied according to the evaluation value, the bit string after decoding can be made more accurate than that of the case where a single value is used as the weighting factor. However, in an exemplary table of the present case, it would be necessary for the evaluation value and the weighting factor to be correlated such that the higher the possibility that the evaluation value indicates the occurrence of interference, the lower the contribution to Viterbi decoding by the corrected soft decision value $V_{l,m,n}$ may become.

Figure 13:
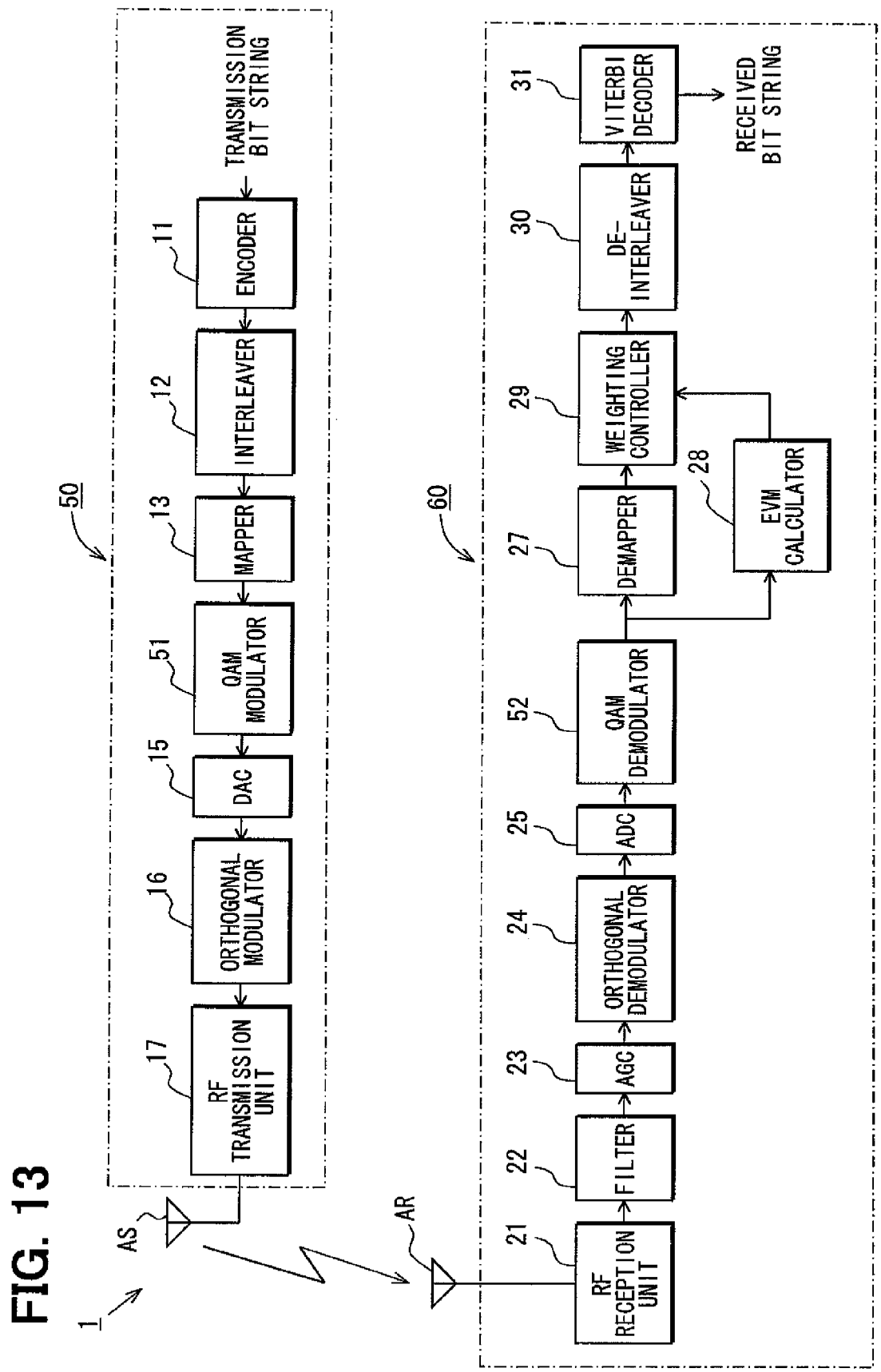
FIG. 13 is a block diagram illustrating an exemplary transmitter and an exemplary receiver constituting a communication system of a modified embodiment.

It should further be noted that, although the communication system in the above-mentioned embodiments uses OFDM as a transmission system, a transmission system is not restricted to such an approach using only OFDM transmission. For example, as shown in FIG. 13, a transmitter 50 may perform primary modulation on an output from the mapper 13 with a QAM modulator 51 by means of $2^N$QAM and subsequently orthogonal modulate and transmit it with the orthogonal modulator 16. However, a receiver 60 needs to be equipped with a QAM demodulator 52 as a demodulator corresponding to the QAM modulator 51 of the transmitter 50. Moreover, the EVM calculator 28 of the receiver 60 is required to calculate the evaluation value with an output from the QAM demodulator 52 using the detection distance and the standard deviation, as in the above-mentioned embodiments. Still further, QAM need not be the only usable modulation system as PSK may be used. In short, in an exemplary communication system, OFDM modulation/demodulation may not need to be executed.

In the present case, the evaluation value may be calculated using the average value that uses a symbol of a $2^N$QAM or $2^N$PSK signal and the calculation method of the average from a plurality of symbols and a method for calculating an average from the number of sampling in a single symbol are enumerated. However, in the latter case, it is necessary to calculate the average from the reception signal outputted from ADC 25.

Moreover, although the interleaving of the above embodiments is described as being executed while bits constituting a bit string exist over the OFDM symbols in the packet so that, bit strings after the interleaving are distributed in the packet, the interleaving method is not restricted to such an approach. For example, any well-known interleaving method may be used.

What is claimed is:

1. A soft decision value correction method for correcting a soft decision value generated by demodulating means in a receiver equipped with demodulating means for generating the soft decision value used in decoding an error correcting code,
   (i) by mapping each symbol of N-bits, N being an integer greater than or equal to 1, for an input bit string that has been coded with the error correcting code and has been rearranged by interleaving at any one of $2^N$ reference mapping locations on a complex plane, and
   (ii) by demodulating a reception signal that was modulated so as to become a signal having an amplitude and a phase correlated to the reference mapping location at which mapping was done,
   the soft decision value correction method comprising:
   (1) a variation degree calculation process of calculating a variation degree of the reception signal; and
   (2) a soft decision value correction process of, when the variation degree calculated in the variation degree calculation process is more than or equal to a prespecified normal threshold, determining that interference in the reception signal occurs, and correcting the soft decision value for each symbol so that a contribution to decoding of the error correcting code may decrease.

2. The soft decision value correction method according to claim 1,
   wherein
   the variation degree calculation process finds, at the time of demodulating the reception signal, the shortest distance among distances between signal point locations represented on the complex plane according to amplitudes and phases detected on the symbol basis and each of the reference mapping locations as a detection distance and defines the detection distance as the variation degree.

3. The soft decision value correction method according to claim 1,
   wherein
   the variation degree calculation process is for, at the time of demodulating the reception signal, finding the shortest distance as a detection distance, among distances between signal point locations represented on the complex plane according to amplitudes and phases that are detected on the symbol basis, and each of the reference mapping locations, finding an average detection distance by averaging the detection distances for a prespecified normal number of symbols, and designating the average detection distance as the variation degree.

4. The soft decision value correction method according to claim 1,
   wherein
   the variation degree calculation process is for, at the time of demodulating the reception signal,
   finding the shortest distance, as a detection distance, among distances between the signal point locations represented on a complex plane according to amplitudes and phases that are detected on the symbol basis, and each of the reference mapping locations, and
   designating a detection distance as a reference distance, that was first obtained after the start of receiving as the reception signal, obtaining a difference between the reference distance and the detection distance as a detection difference, and designating that detection difference as the variation degree.

5. The soft decision value correction method according to claim 1,
   wherein
   the variation degree calculation process is for, at the time of demodulating the reception signal,
   finding the shortest distance as a detection distance, among distances between the signal point locations represented on the complex plane according to amplitudes and phases that are detected on the symbol basis and each of the reference mapping positions,
   finding an average detection distance found by averaging the detection distances for a prespecified normal number of symbols,
   designating the average detection distance that was first obtained after the start of receiving the reception signal as a reference distance, and
   designating a difference between the reference distance and the detection distance as the variation degree.

6. The soft decision value correction method according to claim 1,
   wherein
   the variation degree calculation process is for, at the time of demodulating the reception signal,
   designating an amplitude detected on the symbol basis as a detection amplitude,
   finding a standard deviation of the detection amplitude as a detection deviation based on the detection amplitudes for a prespecified normal number of symbols, and
   designating the detection deviation as the variation degree.

7. The soft decision value correction method according claim 1,
   wherein
   the variation degree calculation process
   designates an amplitude detected on the symbol basis at the time of demodulating the reception signal as a detection amplitude,
   finds a standard deviation of the detection amplitude based on the detection amplitude for the prespecified normal number of symbols as detection deviation,
   designates the detection deviation that was first obtained after the start of receiving the reception signal as a reference deviation, and
   designates a difference between the reference deviation and the detection deviation as the variation degree.

8. The soft decision value correction method according to claim 1,
   wherein, in the soft decision value correction process,
   when the variation degree is more than or equal to the normal threshold, the soft decision value is multiplied by a prespecified weighting factor.

9. The soft decision value correction method according to claim 8,
   wherein,
   in the soft decision value correction process, the weighting factor is determined following a table in which the variation degree and the weighting factor are correlated in advance so that a contribution to decoding of the error correcting code may decrease with increasing of the variation degree.

10. The soft decision value correction method according to claim 1,
wherein
the reception signal received by the receiver is one that was transmitted by an orthogonal frequency division multiplexing method, and
the variation degree calculation process is for calculating the variation degree based on a complex signal on a frequency axis outputted at the time of demodulating the reception signal.

11. The soft decision value correction method according to claim 1,
wherein
the receiver receives the input bit string as a single packet comprised of a plurality of symbols,
the interleaver allocates each bit before interleaving to a plurality of symbols received at different times respectively in the packet following a predetermined rule such that a continuous arrangement among the bits constituting the input bit string before the interleaving may become discontinuous.

12. A receiver having demodulating means for generating a soft decision value used for decoding of an error correcting code
  (i) by mapping each symbol of N-bits of an input bit string coded with the error correcting code and rearranged by interleaving at any one of $2^N$ reference mapping locations being set on a complex plane, where N is an integer greater than or equal to 1, and
  (ii) by demodulating the reception signal so as to form a signal having an amplitude and a phase correlated to one of the $2^N$ reference mapping location,
the receiver further comprising:
  (1) variation degree calculating means for calculating variation degree of the reception signal; and
  (2) soft decision value correcting means for, when the variation degree calculated by the variation degree calculating means is greater than or equal to a prespecified normal threshold, determining that interference in the reception signal occurred and correcting the soft decision value for each symbol so that a contribution to decoding of the error correcting code may decrease.

* * * * *